United States Patent
Decaluwe et al.

(10) Patent No.: US 10,638,723 B2
(45) Date of Patent: May 5, 2020

(54) FEMALE PART OF AN ANIMAL-IDENTIFICATION DEVICE COMPRISING AN ELEMENT FOR LOCKING THE MALE PART INSIDE THE FEMALE PART

(71) Applicant: ALLFLEX EUROPE, Vitre (FR)

(72) Inventors: Johan Decaluwe, Laval (FR);
Jean-Jacques Hilpert, Vitre (FR);
Jean-Jacques Destoumieux, Lescure d'albigeois (FR); Bruno Teychene, Mouzieys-Teulet (FR)

(73) Assignee: ALLFLEX EUROPE, Vitre (FR)

( * ) Notice: Subject to any disclaimer, the term of this patent is extended or adjusted under 35 U.S.C. 154(b) by 0 days.

(21) Appl. No.: 16/320,336

(22) PCT Filed: Jul. 11, 2017

(86) PCT No.: PCT/EP2017/067391
§ 371 (c)(1),
(2) Date: Jan. 24, 2019

(87) PCT Pub. No.: WO2018/019571
PCT Pub. Date: Feb. 1, 2018

(65) Prior Publication Data
US 2019/0274283 A1   Sep. 12, 2019

(30) Foreign Application Priority Data
Jul. 27, 2016   (FR) ..................... 16 57216

(51) Int. Cl.
*A01K 11/00*   (2006.01)
*G09F 3/02*   (2006.01)
(52) U.S. Cl.
CPC .............. *A01K 11/001* (2013.01); *G09F 3/02* (2013.01)

(58) Field of Classification Search
CPC ......... Y10T 24/45717; Y10T 24/45775; Y10T 24/45785; F16B 21/00; F16B 21/073; A01K 11/001; A01K 11/00
See application file for complete search history.

(56) References Cited

U.S. PATENT DOCUMENTS 4,694,781 A * 9/1987 Howe ................. A01K 13/003
119/655
4,953,313 A * 9/1990 Scott .................... A01K 11/001
40/301

(Continued)

FOREIGN PATENT DOCUMENTS

AU   2004233502 A1   6/2005
CN    201967479 U    9/2011

(Continued)

OTHER PUBLICATIONS

French Search Report and Written Opinion dated Feb. 20, 2017 for corresponding French Application No. 1657216 filed Jul. 27, 2016.

(Continued)

*Primary Examiner* — Cassandra Davis
(74) *Attorney, Agent, or Firm* — David D. Brush; Westman, Champlin & Koehler, P.A.

(57) ABSTRACT

A female part of an animal-identifying device, which includes a cavity intended to receive a head of a male part of said animal-identifying device. The cavity has a blocking element to hold the head inside the cavity. The blocking element has a base and at least two resilient claws extend from the base towards the entrance of the cavity. The claws are movable between at least two positions, one insertion position enabling the insertion of the head into the cavity and one blocking position enabling the blocking of the male head inside the cavity.

14 Claims, 4 Drawing Sheets

(56) References Cited

U.S. PATENT DOCUMENTS

| | | | |
|---|---|---|---|
| 6,666,170 B1 | 12/2003 | Hilpert | |
| 6,708,432 B2* | 3/2004 | Haar | A01K 11/001 40/301 |
| 7,895,776 B2 | 3/2011 | Costantini et al. | |
| 9,192,143 B2 | 11/2015 | Hilpert | |

FOREIGN PATENT DOCUMENTS

| | | |
|---|---|---|
| EP | 0056533 A1 | 7/1982 |
| ES | 2257979 A1 | 8/2006 |
| GB | 2294661 A1 | 5/1995 |
| JP | 2005065598 A | 3/2005 |
| NZ | 617791 | 11/2013 |
| WO | 9110982 A1 | 7/1991 |
| WO | 2004010773 A1 | 2/2004 |
| WO | 2006045162 A2 | 5/2006 |
| WO | 2007009553 A1 | 1/2007 |
| WO | 2007042528 A2 | 4/2007 |
| WO | 2007042528 A3 | 4/2007 |
| WO | 2008142277 A2 | 11/2008 |
| WO | 2008142277 A3 | 11/2008 |
| WO | 2012071670 A1 | 6/2012 |
| WO | 2014042540 A1 | 3/2014 |

OTHER PUBLICATIONS

International Preliminary Report on Patentability dated Jun. 25, 2018 for corresponding International Application No. PCT/EP20171067391, filed Jul. 11, 2017 (machine translation).
International Search Report dated Sep. 6, 2017 for corresponding International Application No. PCT/EP2017/067391, filed Jul. 11, 2017.
Written Opinion of the International Searching Authority dated Sep. 6, 2017 for corresponding International Application No. PCT/EP2017/067391, filed Jul. 11, 2017.
English translation of the International Preliminary Report on Patentability dated Jun. 25, 2018 for corresponding International Application No. PCT/EP2017/067391, filed Jul. 11, 2017.
Machine translation of Colombian Office Action dated Jan. 22, 2020 for corresponding Colombian Application No. NC2019/0000285.

* cited by examiner

FEMALE PART OF AN ANIMAL-IDENTIFICATION DEVICE COMPRISING AN ELEMENT FOR LOCKING THE MALE PART INSIDE THE FEMALE PART

CROSS-REFERENCE TO RELATED APPLICATIONS

This Application is a Section 371 National Stage Application of International Application No. PCT/EP2017/067391, filed Jul. 11, 2017, which is incorporated by reference in its entirety and published as WO 2018/019571 A1 on Feb. 1, 2018, not in English.

1. FIELD OF THE INVENTION

The field of the invention is that of the tagging of animals by means of an animal-identifying device intended to be affixed to an animal.

More specifically, the invention relates to the female part of such an animal-identifying device and more specifically to a blocking element provided in the female part, enabling the male part to be blocked in the female part.

2. PRIOR ART

The classic method used to improve the tracking of livestock and/or to guarantee the origin of animals is to tag the animals by affixing an animal-identifying device, for example into an animal's ear.

Such animal-identifying devices, in their classic form, comprise a male part, formed by a rod extending from a support and terminating in a head that is generally pointed and a female part comprising a cavity for receiving the head of the male part.

Such devices need to be unbreachable in order to ensure the traceability of the animal, i.e. it should not be possible to remove an identification device placed on a first animal and then reposition it on a second animal.

To this end, there is especially a known way of using retaining elements enabling the head of a male part to be retained within the receiving cavity of a female part once the head of the male part has been inserted into the female part.

Figure 1A:
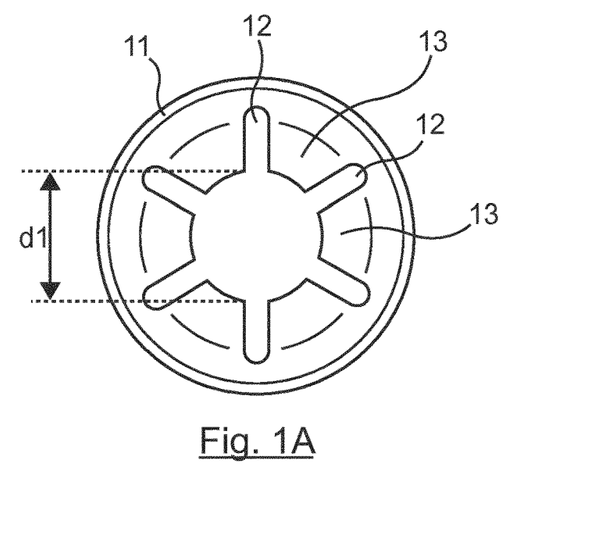
FIGS. 1A and 1B illustrate an example of a ring used to hold a male part in a female part according to the prior art.
Figure 1B:
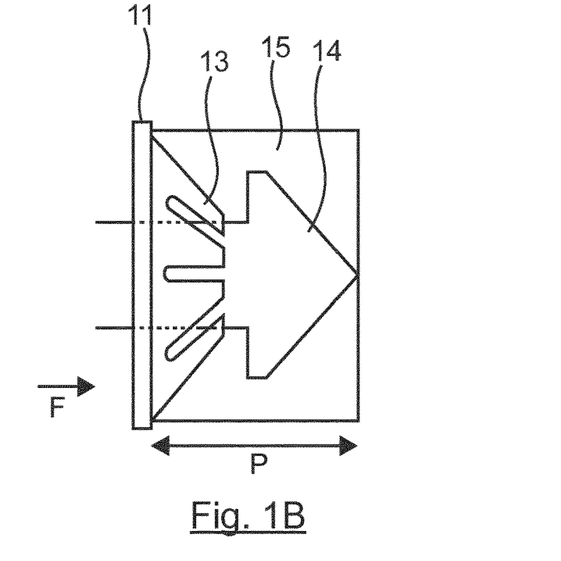

As illustrated in FIGS. 1A and 1B, such retaining elements take for example the form of a ring having several slots 12 that delimit toes 13. Such a ring is intended for being positioned at the entrance to the female part. Thus, when the head 14 of the male part penetrates the female part, in the direction of the arrow F, the toes 13, pushed by the male part 14, move apart slightly and then return into their position when the male part has crossed the ring 11, to block the male head 14 within the receiving cavity 15 of the female part.

For example, the inner diameter dl of the ring passes from 5 mm to 6 mm when the male head 14 pushes the toes 13 and then returns to 5 mm when the male head 14 is inserted into the reception cavity 15 of the female part.

Such toes 13 can be inclined relative to the periphery of the ring, their unattached extremity being pointed towards the back of the receiving cavity (i.e. inclined in a direction opposite the entrance of the receiving cavity) so as to facilitate the passage of the male head from the entrance hole to the back of the receiving cavity.

Such a ring therefore enables the passage of the male part so that it gets into the cavity of the female part but prevents its withdrawal and therefore prevents the opening of the male and female parts.

One drawback of such a ring is that it requires the exertion of great force in order to make the male head penetrate the female part. Indeed, the toes 13 must be forcefully folded so that the inner diameter dl of the ring passes from 5 mm to 6 mm for example. Now the bending of these toes 13, especially when the ring is made of metal, is relatively limited, thus inducing the use of substantial force.

In addition, the use of such a ring calls for a great depth P of the cavity. Indeed, the depth of the cavity must be planned to allow the bending of the toes 13 towards the back of the cavity so that the male head can penetrate the cavity 15. Now once the male head is inserted into the receiving cavity and once the toes 13 have resumed their initial position, the male head is not blocked between the unattached extremity of the toes and the back of the cavity. There is therefore a clearance or play at the level of the male head and a risk that branchings, electrical wires or the like will get inserted between the support of the male part and the female part.

There is therefore a need for a novel identification device that is unbreachable and does not have all the drawbacks of the prior art.

3. SUMMARY OF THE INVENTION

The invention proposes a novel solution in the form of a female part of an animal-identifying device, comprising a cavity intended to receive a head of a male part of the animal-identifying device.

According to the invention, such a cavity comprises a blocking element that is intended to hold the head of the male part inside the cavity of the female part, said blocking element comprising a base and at least two resilient claws extending from the base towards the entrance of said cavity, the claws being movable between at least two positions, one insertion position enabling the insertion of the male head into the cavity and one blocking position enabling the blocking of the male head inside said cavity.

Thus, the invention proposes a novel and inventive female part relying on the presence of a spring-forming blocking element within the reception cavity, enabling the passage of the male head so that it is inserted into the cavity of the female part but preventing its withdrawal.

In particular, the proposed solution offers a solution to improving the unbreachable nature of animal-identifying devices without reducing ease of affixing or increasing manufacturing costs.

More specifically, the presence of resilient claws extending from the base of the blocking element towards the entrance of the cavity reduces the positioning force needed to make the male part penetrate the female part. Indeed, a slight bending of the resilient claws is sufficient to make the aperture of the reception cavity become bigger in order to enable the passage of the male head. It may be recalled that, according to the prior art, the toes extend towards the back of the receiving cavity, thus calling for the exertion of substantial force in order to make the male head penetrate the female part.

In addition, the presence of resilient claws extending from the base of the blocking element towards the entrance of the cavity makes it possible to preserve a shallow cavity. Indeed, since a slight bending of the resilient claws is sufficient for the male head to be able to penetrate the cavity, it is not necessary to increase the depth of the cavity. Hence, the clearance or play at the level of the male head in the cavity of the female part can be greatly reduced, thus improving the resistance of the animal-identifying device over time.

In particular, the blocking element according to the invention has a height that is appreciably equal to the height of the cavity. The resilient claws therefore have a length greater than those of the prior-art claws. As compared with the toes used in the prior art, the use of longer claws reduces the folding angle needed to obtain a same aperture.

The base and/or the claws of the blocking element can be made out of metal, for example steel, out of plastic, for example nylon, or out of resin or a composite material possibly a fiberglass-enriched material, etc.

Such elements are therefore particularly resistant to external aggression and thus improve the unbreachable nature of the animal-identifying device. In particular, such elements are resistant to high temperatures and especially to buckling, scalding, etc. They can therefore be removed from an animal after it has been slaughtered.

In particular, the blocking element defines a housing suited to receiving the head of the male part, the base of the blocking element being intended to receive the pointed extremity of said head.

Thus, the blocking element will take the shape of a disk against which the extremity (the point) of the male head can take support and the claws of which have a flared shape extending from the base towards the entrance of the cavity.

As a variant, the base of the blocking element is cylindrical, or partially spherical, and the claws are truncatedly conical, the axis generated by revolution of the blocking element coinciding with a joining axis between the female part and the male part (i.e. it coincides with the axis of the cavity).

In particular, if the base of the blocking element is a spherical cap (male sphere) having a shape complementary with the back of the cavity of the female part (female sphere), a ball-and-socket connection is obtained between the blocking element and the female part.

After the animal-identifying device is positioned, i.e. when the male part is blocked in the blocking element, the ball-and-socket connection offers three degrees of freedom in rotation between the male part and the female part, thus reducing the risk of breakage of the animal-identification part and/or the tearing of the animal's ear.

According to these different configurations, the base is situated at the back of the cavity in the blocking position (but not necessarily in direct contact with the back of the cavity).

According to one particular embodiment, the base of the blocking element has a back wall. Thus, when the male head is inserted into the cavity of the female part, the extremity (pointed tip) of the male head abuts the back wall of the base of the blocking element and the male part is blocked between the claws and the back of the base of the blocking element. The risk that external elements (branchings, electrical wires, etc.) may get inserted between the male and female parts is thus reduced.

In particular, such a back wall, which may be designed with a hard material (metal, nylon, rigid plastic, composite material, etc.) improves the unbreachable nature of the animal-identifying device in creating a shielding that makes it difficult to carry out any intrusion by drilling, bending, etc.

According to one particular embodiment, said claws are distributed uniformly around the base of the blocking element.

Thus it is ensured that the male part will be held more efficiently in the female part and that the animal-identifying device will have a longer service life.

For example, the blocking element comprises ten claws.

According to one particular embodiment, the claws are stressed into opening in the insertion position.

It is therefore not necessary to exert additional force to move the claws apart during the insertion of the male head into the female part, thus facilitating the positioning of the animal-identifying device (and reducing the force needed to place the device as compared with the prior-art techniques). It may be recalled that the prior-art system, on the contrary, makes it necessary to deform a retaining element, such as the toes of a ring, to make the male head penetrate the female part, thus giving rise to a positioning stress.

According to a first example, in the insertion position, the unattached extremity of the claws is held in a groove of the female part. Such a groove is located at the entrance to the cavity, the resilient claws extending from the base of the blocking element towards the entrance of the cavity.

According to a second example, the female part comprises a cover for receiving the male head, defining the cavity, and a crown-shaped lid fixedly attached to the receiving cover, defining the entrance to the cavity, and the unattached extremity of the claws is held in a recess of the lid in the insertion position.

According to a third example, the unattached extremity of the claws is held by a safety ring provided at the entrance of the cavity.

According to one particular embodiment, the base of the blocking element is not in contact with the back of the cavity in the insertion position, and the base of the blocking element is in contact with the back of the cavity in the blocking position.

Thus, the insertion of the male head into the female part causes the blocking element to slide inside the reception cavity of the female part along the joining axis between the male and female parts (i.e. the axis of the cavity). Such a sliding movement releases the unattached extremity of the claws, which were stressed into opening in the insertion position. The passage from the insertion position to the blocking position is therefore prompted by the insertion of the male head into the cavity of the female part.

According to one particular characteristic of the invention, the female part also comprises locking means that lock the blocking element in the blocking position.

Such locking means prevent the opening of the blocking element (i.e. the flexible claws) in the blocking position.

In particular, the perimeter defined by the unattached extremity of the claws in the blocking position is appreciably equal to the perimeter of a section of the male part.

The blocking is therefore done on the totality or near totality of the circumference of the rod of the male part, for example with the unattached extremity of the claws of the blocking element coming into contact with the totality or near totality of the circumference of the rod whereas, according to the prior art, the slots between the toes dictated the presence of a space between each toe and the next one.

With a female part according to the invention, the pressure of contact on the male head is therefore lower than it was with the prior-art techniques since the contact surface between the blocking element and the male part is greater. The risk of tearing is therefore smaller. Thus, the animal-identifying device is provided with greater lasting capacity over time.

4. LIST OF FIGURES

Other features and advantages of the invention shall appear more clearly from the following description of a particular embodiment given by way of a simple, illustratory and non-exhaustive example and from the appended drawings of which.

5. DESCRIPTION OF EMBODIMENTS OF THE INVENTION

5.1 General Principle

The general principle of the invention relies on the use of a blocking element provided within the receiving cavity of a female part, enabling the passage of a head of a male part so that it is inserted into the cavity of the female part, but preventing its withdrawal.

Figure 2:
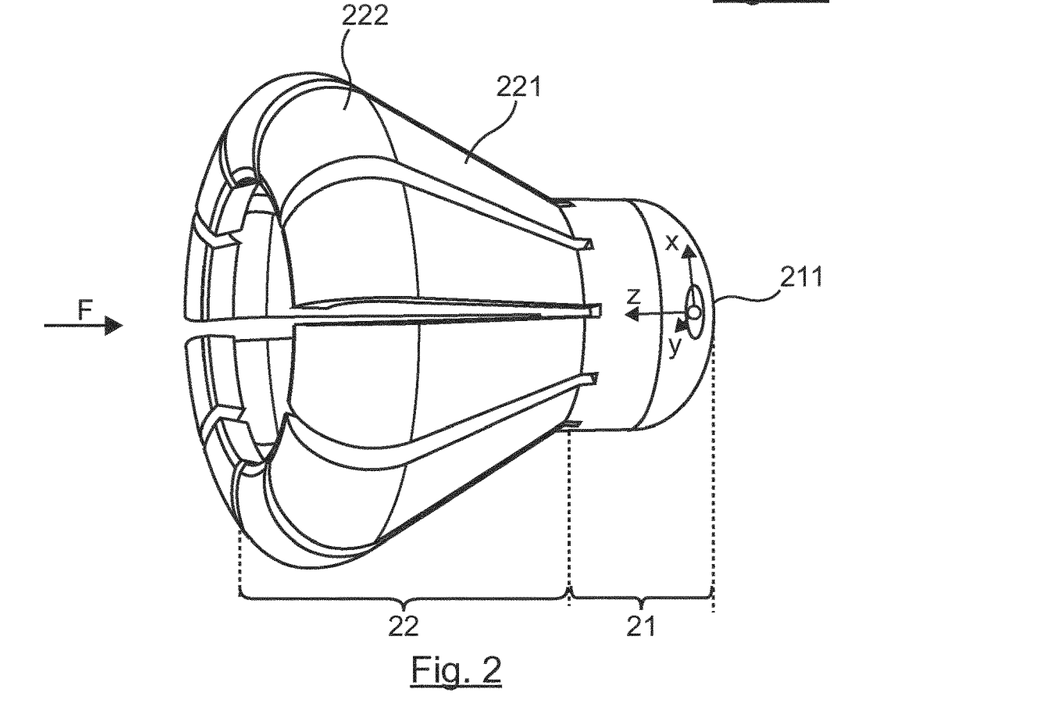
FIG. 2 illustrates a blocking element according to one embodiment of the invention.

Such a blocking element is illustrated in FIG. 2. It comprises a base 21 and at least two resilient claws 22 extending from the base 21 towards the entrance of the cavity of the female part. The elasticity or resilience of the claws can be obtained by using a material such as metal, nylon, a fiberglass-enriched composite material, etc.

The base 21 can have a two-dimensional circular shape, such as the shape of a ring, a disc, or a three-dimensional shape such as the shape of a cylinder and/or a half-sphere or a sphere segment (in particular a spherical cap), so that it can cooperate with the back of the cavity of the female parts classically used in the field of animal identification. It can especially have a back wall 211 which can be plane or rounded. For example, as shown in FIG. 2, the base is formed by a hollow cylinder having a rounded back wall taking the form of a spherical cap.

The claws 22 extend from the disc or the ring forming the base 21 or from the extremity (base) of the cylinder or from the sphere segment, opposite the back of the cavity, towards the entrance hole of the cavity. It has a flared shape (i.e. the diameter defined by the unattached extremity of the claws is greater than the diameter defined at the base of the claws) and it is truncatedly conical so as to define a housing adapted to receiving the head of the male part. The claws are advantageously distributed uniformly around the base.

Each claw is formed by a spring leaf which can be folded back as a hook to maintain the male head in a blocked position. For example, each claw 22 has at least two portions, including one straight portion 221 defining the flared shape and a curved portion 222 defining the hook. For example, the straight portion has a length of the order of 7 mm to 10 mm and the curved portion has a length of the order of 1 mm to 3 mm.

These claws are movable between two positions, a position of insertion enabling the insertion of the head into the cavity (in the direction of the arrow F) and a blocking position enabling the blocking of the head within the cavity. In the insertion position, the claws are slightly spaced apart to let through the male head. In the blocking position, the claws block the male part in position within the female cavity.

According to one particular embodiment, the number and/or dimension of the claws are chosen so that, in the blocked position, the perimeter defined by the unattached extremity of the claws is appreciably equal to the perimeter of a section of the male part, for example to the perimeter of a section of the rod of the male part. In other words, the inner diameter defined by the unattached extremity of the claws is appreciably equal to the diameter of the rod at the junction between the rod and the male head.

Here below, we describe different examples of implementation of the invention.

Classically, an animal-identifying device is deemed to comprise a male part, formed by a rod extending from a support and terminating in a head, and a female part comprising a cavity for receiving the head of the male part. At its base, the male part has a diameter greater than that of the rod. The junction between the rod and the male head therefore defines a first shoulder. If necessary, a second shoulder can be defined on the rod.

Such an animal-identifying device can especially be formed by two parts comprising a male part and a female part that are separate or a single part, the male part and the female part being then linked by a flexible link.

5.2 First Embodiment

Figure 3A:
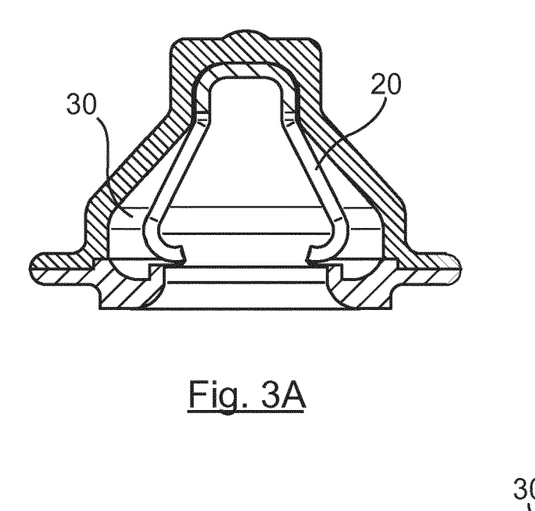
FIGS. 3A to 3C illustrate a first embodiment of the invention according to which the blocking element is not pre-stressed into opening.
Figure 3B:
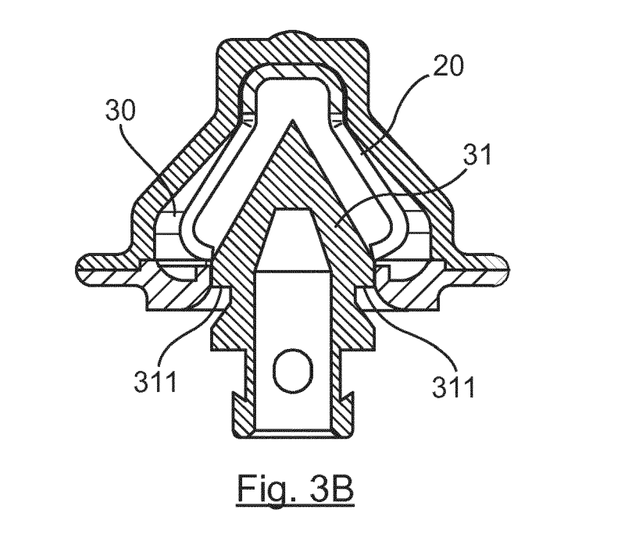
Figure 3C:
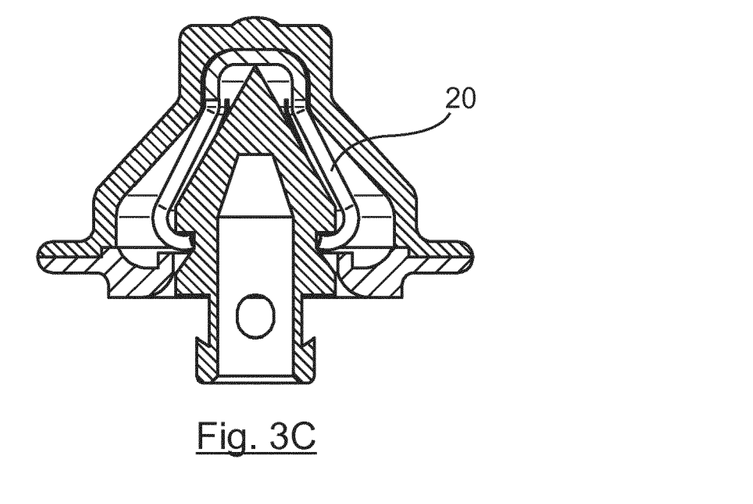

Referring to FIGS. 3A to 3C, we describe a first embodiment of the invention according to which claws of the blocking element are "relaxed" before the male part is inserted into the female part.

Before the male head is inserted into the female part, the blocking element 20 is in a resting position as illustrated in FIG. 3A. For example, the base of the blocking element 20 is in contact with the back of the cavity 30 and no stress is applied to the claws of the blocking element 20 which are therefore "relaxed".

When the male part is inserted into the female part, the pointed shape of the male head 31 enables the claws of the blocking element 20 to be gradually moved apart up to the maximum diameter of the male head as illustrated in FIG. 3B. A stress is therefore exerted by the male part 31 on the claws of the blocking element 20. This position corresponds to a position of insertion, enabling the head to be inserted into the cavity.

As illustrated in FIG. 3C, once the male head is inserted into the cavity 30, i.e. once the first shoulder 311 of the male head has passed through the unattached extremity of the claws, the stress exerted by the male head on the claws of the blocking element 20 is relaxed and the claws resume their original position. In this position, the claws of the blocking element grip the male part at the base of the first shoulder 311. This position corresponds to a blocking position enabling the male head to be blocked inside the cavity.

If necessary, locking means, such as a locking ring, can be used to lock the blocking element into the blocked position preventing especially the opening/spreading apart of the claws after insertion of the male head into the female part.

5.3 Second Embodiment

Referring henceforth to FIGS. 4A to 6B, we present a second embodiment of the invention according to which the claws of the blocking element are stressed into opening before the male part is inserted into the female part.

Figure 4A:
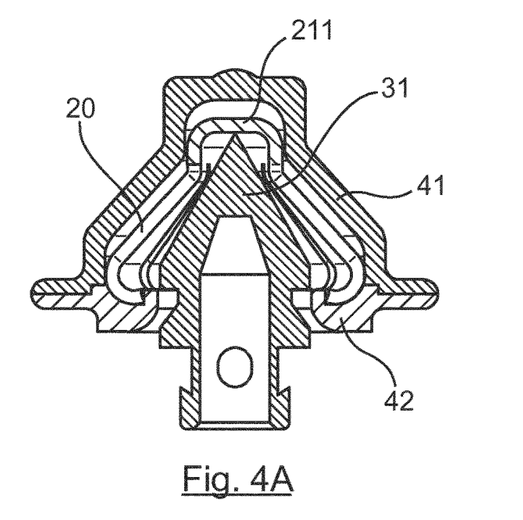
FIGS. 4A and 4B, 6A and 6B illustrate two variants of a second embodiment of the invention according to which the blocking element is pre-stressed into opening.
Figure 4B:
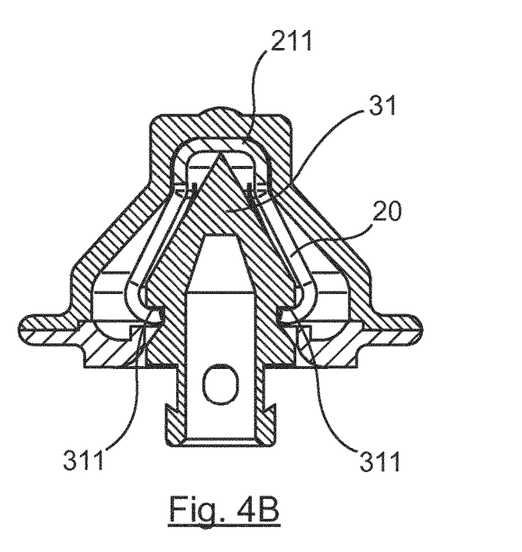

According to the first example illustrated in FIGS. 4A and 4B, it is considered for example that the female part comprises a cover 41 for receiving the head of the male part, defining the cavity, a crown-shaped lid 42 fixedly attached to the receiving cover, defining the entrance to the cavity, and the element 20 for blocking the male head in the female part. The lid 42 can if necessary be closed by a tearable shutter ensuring first-time use of the female part and preventing the introduction of fouling material within the cavity. Such a shutter can be torn by the male head during the insertion of the male head into the female part.

Before the male head 31 is inserted into the female part, the blocking element 20 is stressed into opening, as illustrated in FIG. 4A. To this end, the unattached extremity of each claw of the blocking element 20 is placed in a housing of the female part so as to force the opening of the claws. For example, such a housing is a groove formed in the female part at the entrance hole of the cavity. Such a housing can also be a recess formed in the lid 42. This position corresponds to a position of insertion enabling the insertion of the head into the cavity.

In this insertion position, the base of the blocking element 20 is not in contact with the back of the cavity.

The male head 31 can easily penetrate the receiving cavity of the female part, since the claws of the blocking element are stressed into opening and therefore do not hamper the introduction of the male head. The laying or positioning force is therefore reduced. When the pointed extremity of the male head abuts the back wall 211 on the blocking element 20, the male head pushes the back wall 211 towards the back of the cavity of the female part. As illustrated in FIG. 4B, the translation of the blocking element 20 towards the back of the cavity releases the claws from their housing as soon as the movement is sufficient (for example when the back wall 211 of the blocking element 20 comes into contact with the back of the cavity, or before this happens). The stress exerted on the claws of the blocking element 20 is therefore relaxed and the claws can close. In this position, the claws of the blocking element grip the male part at the base of the first shoulder 311. This position corresponds to a blocking position, enabling the blocking of the male head within the cavity.

Figure 5A:
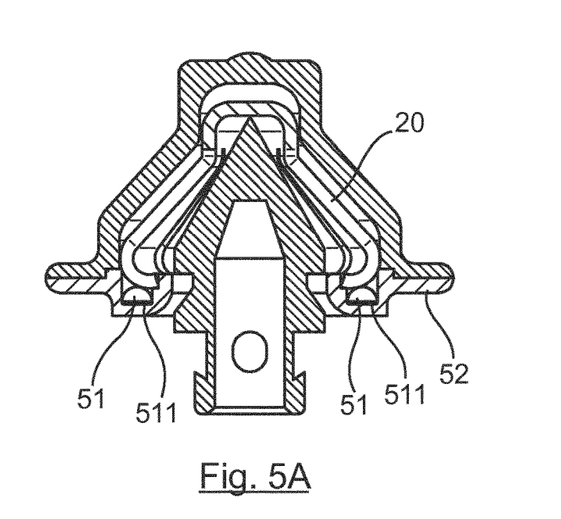
FIGS. 5A and 5B propose an example of the locking of the blocking element in the blocked position.
Figure 5B:
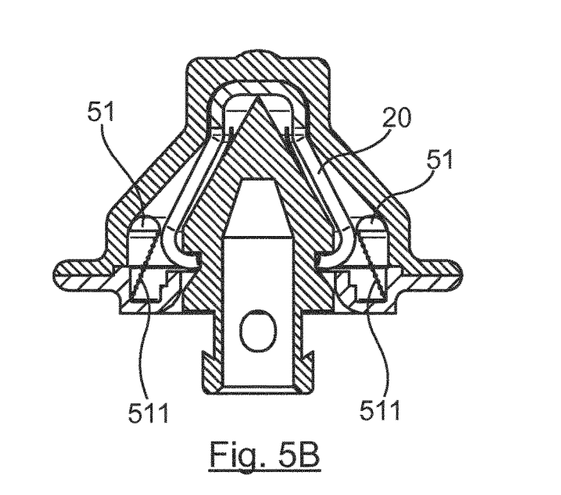

As illustrated in FIGS. 5A and 5B, locking means 51 can be used to lock the blocking element in the blocking position. For example, such locking means comprise a locking ring or locking balls.

In the insertion position, these locking means 51 are held by the claws of the blocking element 20 in the housing of the female part (for example a housing provided in the lid 52). In the blocking position, these locking means 51 are released.

According to the example illustrated in FIGS. 5A and 53, in the insertion position, the claws of the blocking element compress the ring (or the balls) and a locking spring 511 against a wall of a housing provided for this purpose on the female part. As described here above with reference to FIGS. 4A and 4B, the base of the locking element 20 is not in contact with the back of the cavity in this insertion position.

When the male head pushes the back wall 211 of the blocking element 20 towards the back of the cavity of the female part, the stress exerted on the claws of the blocking element 20 is relaxed and, as a result, the stress exerted on the ring (or the balls) and the locking spring 511 is relaxed. The locking spring 511, which is released, propels the locking ring (or the balls) out of its housing (or their housings) towards the back of the cavity up to a stop position in which the ring (or the balls) come into contact with the internal wall of the cavity and the claws. In this position, the ring locks the blocking element 20 in preventing the opening/spreading of the claws, since the ring rests, on the one hand, on the inner wall of the cavity and, on the other hand, on the claws.

Figure 6A:
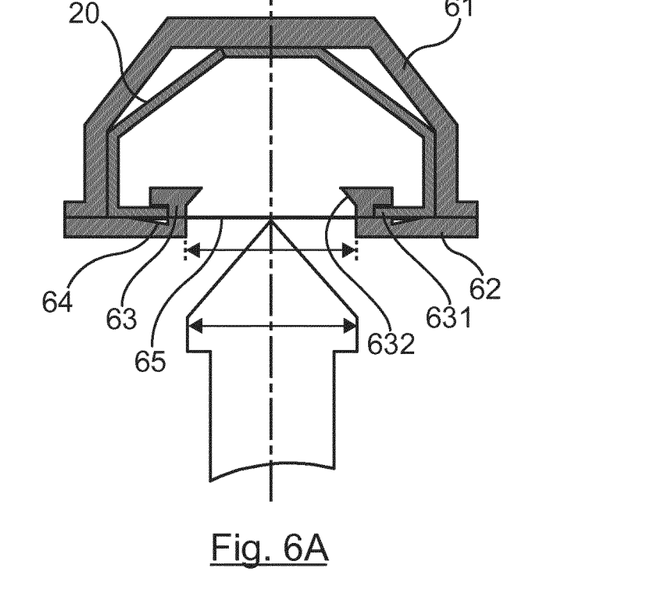
Figure 6B:
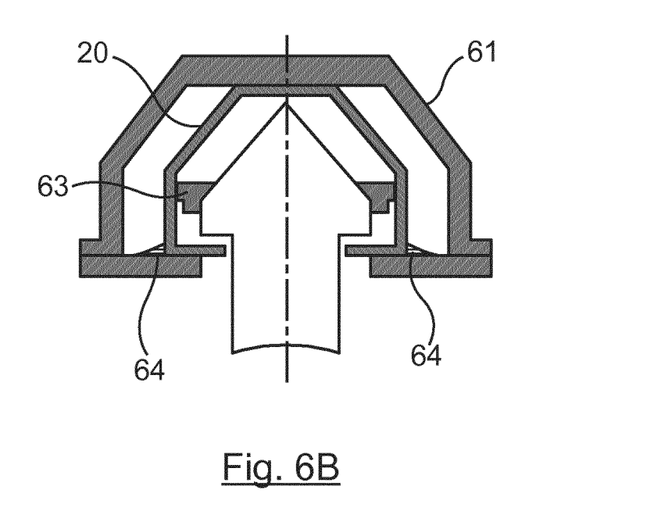

According to the second example illustrated in FIGS. 6A and 6B, it is considered for example that the female part comprises a cover 61 for receiving the head of the male part, defining the cavity, a crown-shaped lid 62 fixedly attached to the receiving cover, the element 20 for blocking the male head in the female part and a safety ring 63 enabling the claws of the blocking element to be stressed into opening.

For example, such a safety ring 63 is fixedly attached to the lid 62 within the cavity, in a reversible way. The lid 62 and the safety ring define the entrance of the cavity. The safety ring 63 or the lid 62 can if necessary be closed by a tearable shutter 65 ensuring the first-time use of the female part and preventing the introduction of fouling matter inside the cavity. Such a shutter can be torn by the male head during the insertion of the male head into the female part.

Such a safety ring 63 has, on its external wall, a housing 631 such as a recess enabling the claws of the blocking element to be held in an open position in the insertion position. Such a safety ring 63 also has, on its inner wall, a support surface 632 against which the male head can lean to detach the safety ring from the lid 62.

Thus, as illustrated in FIG. 6A, before the male head is inserted into the female part, the blocking element 20 is stressed into opening. This position corresponds to a position of insertion enabling the head to be inserted into the cavity.

When the male head penetrates the cavity, as illustrated in FIG. 6B, this head pushes the safety ring 63 towards the back of the cavity of the female part. The translation of the safety ring 63 towards the back of the cavity releases the claws from their housing. The stress exerted on the claws of the blocking element 20 is therefore relaxed and the claws can close. In this position, the claws of the blocking element grip the rod of the male part at the base of a shoulder formed at the junction of the rod and the male head. This position corresponds to a blocking position, enabling the male head to be blocked inside the cavity.

As illustrated in FIGS. 6A and 6B, locking means 64 can also be used to lock the blocking element in the blocked position according to this second example. For example, such locking means take the form of a movable part such as a button or non-return lip valve.

In the position of insertion, the safety ring 63 and/or the open claws of the blocking element rest on the lips 64 (or the button) to keep them depressed in a housing of the lid 62.

When the male head pushes the safety ring 63 towards the back of the cavity of the female part, the stress exerted on the claws of the blocking element 20 is relaxed and, thereafter, the lips 64 (or the button) are relaxed.

The lips 64 are therefore no longer depressed in a housing of the lid 62 but protruding. In this position, the protruding lips 64 lock the locking element 20 in preventing the opening/spreading of the claws.

5.4 Variants

Here above, we have presented different examples of embodiments of the invention according to which the female part has a truncatedly conical shape. Naturally, other shapes can be envisaged, such as for example a cylindrical shape or the like. In the same way, the shape of the receiving cavity can be different, and for example cylindrical.

Besides, the male part can also have different shapes, such as those illustrated in FIG. 4A or FIG. 6A. The shape of the female part according to the invention must be adapted to cooperate with the shape chosen for the male part.

The invention claimed is:

1. A female part of an animal-identifying device, comprising:
    a cavity to receive a head of a male part of said animal-identifying device,
    said cavity comprises a blocking element provided within said cavity, to hold said head inside said cavity,
    said blocking element comprising a base and at least two resilient claws extending from said base towards an entrance of said cavity,
    said claws being movable between at least two positions, comprising an insertion position before insertion of the head into the cavity in which the claws are stressed into opening and a blocking position after insertion of the head into the cavity, enabling blocking of said head inside said cavity.

2. The female part according to claim 1, wherein at least one of said base or said claws of said blocking element are made out of metal.

3. The female part according to claim 1, wherein said blocking element defines a housing adapted to receive the head of said male part, said base being configured to receive a pointed extremity of said head.

4. The female part according to claim 1, wherein the base of said blocking element is cylindrical, or partially spherical, and wherein the claws of said blocking element are truncatedly conical having a longitudinal axis generated by revolution of said blocking element about a joining axis at which said female part configured to join with said male part.

5. The female part according to claim 1, wherein the base of said blocking element has a back wall.

6. The female part according to claim 1, wherein said claws are distributed uniformly around said base.

7. The female part according to claim 1, wherein, in said insertion position, a distal end of said claws is held in a groove of said female part.

8. The female part according to claim 1, further comprising a cover for receiving said head of the male part, defining said cavity, and a crown-shaped lid fixedly attached to said cover, defining the entrance to said cavity and wherein, in said insertion position, a distal end of said claws is held in a recess of said lid.

9. The female part according to claim 1, wherein, in said insertion position, a distal end of said claws is held by a safety ring provided at the entrance of said cavity.

10. The female part according to claim 1, wherein, in said insertion position, the base of said blocking element is not in contact with a back of said cavity, and wherein, in said blocking position, the base of said blocking element is in contact with the back of said cavity.

11. The female part according to claim 1, further comprising a lock that locks the blocking element in the blocking position.

12. The female part according to claim 1, wherein the base of the blocking element is a spherical cap having a shape complementary with a back of said cavity.

13. An animal-identifying device comprising:
    a male part having a head and a section with a perimeter; and
    a female part comprising:
        a cavity to receive the head of the male part,
        said cavity comprises a blocking element provided within said cavity, to hold said head inside said cavity,
        said blocking element comprising a base and at least two resilient claws extending from said base towards an entrance of said cavity,
        said claws being movable between at least two positions, comprising an insertion position before insertion of the head into the cavity in which the claws are stressed into opening and a blocking position after insertion of the head into the cavity, enabling blocking of said head inside said cavity.

14. The animal-identifying device according to claim 13, wherein a perimeter defined by a distal end of the claws in the blocking position is appreciably equal to the perimeter of the section of said male part.

\* \* \* \* \*